Patented Nov. 1, 1938

2,135,460

UNITED STATES PATENT OFFICE

2,135,460

PREPARATION OF BORON FLUORIDE

Donald J. Loder, Wilmington, Del., assignor to E. I. du Pont de Nemours & Company, Wilmington, Del., a corporation of Delaware No Drawing. Application August 5, 1936, Serial No. 94,337

8 Claims. (Cl. 23—88)

This invention relates to a process for the preparation of boron-halogen compounds and more particularly to the preparation of boron fluoride.

An object of the present invention is to provide a process for the separation of constituents from complexes containing the same and more particularly to the separation of boron fluoride from its complex. Another object of the invention is to provide a process wherein a boron-halogen containing compound is separated from its complex with water. A further object of the invention is to provide a process wherein an alkaline earth metal halide is added to a complex, compound, mixture, or solution of water and boron fluoride; the water is removed and the boron fluoride recovered in the anhydrous form. A more specific object of the invention is to provide a process wherein complexes containing boron fluoride and water may be so treated that the anhydrous boron fluoride is freed from the water. Other objects and advantages of the invention will hereinafter appear.

I have found that if a boron-halogen-water complex, compound, mixture, or solution is treated with a metal halide the water will be set free, leaving a compound formed between the metal halide and the boron-halogen constituent. Moreover, if alkaline earth metal halides are employed, the alkaline earth metal halide-boron halide reaction product will, upon heating, give up the boron halide it contains leaving the alkaline earth halide as a residue. Accordingly when employing alkaline earth metal halides it is possible to recover the boron-halogen-containing constituent from water.

Boron fluoride, and analogous boron-halogen compounds, form with water and other compounds an association that has been generally called in the literature a "complex." In this specification and the claims appended thereto this association will be referred to as a "complex" altho this term will be understood to include water and a boron halogen compound whether they are present as a solution, mixture, compound, or complex, or whatever may be the manner of their association.

Generally, my process is effected in the following manner; a metal halide is added to the complex containing water and a boron-halogen constituent and apparently due to the fact that the boron-halogen constituent reacts more readily with the metal halide, a complex is preferentially formed between the metal halide and the boron-halogen constituent, thereby freeing the water. After the removal of the water by distillation or other means there remains the metal halide-boron-halogen complex. If the metal halide employed is an alkaline earth halide or an alkaline earth salt or oxide, such, for example, as calcium carbonate, calcium oxide and the like which react with a boron halide to form an alkaline earth halide, the boron-halogen constituent can be obtained in a substantially anhydrous form by simply heating the complex to a temperature of from 150 to 300° C.

The metal halides which have been found particularly well adapted for replacing water from complexes containing them and a boron-halogen-containing compound include, for example, calcium fluoride, zinc fluoride, aluminum fluoride, aluminum chloride, cuprous chloride, lead chloride, iron chloride, tin chloride, calcium chloride, barium chloride, and analogous metal fluorides, chlorides, bromides, and iodides. While metal halides will replace the water in a complex containing it and a boron-halogen constituent, such as boron trifluoride, I have found in addition that the alkaline earth halides and more especially the alkaline earth fluorides form a complex or compound with boron fluoride from which the boron fluoride or other analogous, easily volatilized, halogen-containing compound may be recovered by heating. The alkaline earth halides, such, for example, as the fluorides, chlorides, and bromides of calcium, barium or strontium, and salts thereof which react with boron halides to form alkaline earth halides likewise have the ability to not only displace the water from its complex with a boron halide, but also to permit the recovery of the boron halide from the alkaline earth halide.

The advantages of my process for the preparation of anhydrous volatile halides from complexes containing them can be readily appreciated. For example, hydrated boron fluoride can be prepared by interacting anhydrous hydrofluoric acid with solid orthoboric acid, boric anhydrides or borates. The reaction may be effected by the addition of the anhydrous hydrogen fluoride to the solid orthoboric acid, boric anhydride or borate which comprises essentially a hydrated boron trifluoride. To this product calcium fluoride is added, water is liberated and can be removed by a simple heating operation to a temperature of about 110° C. thereby leaving as a residue a compound containing calcium fluoride and boron fluoride. By heating this substantially anhydrous material to a higher temperature, say form 170 to 500° C., usually a temperature of 250° C. is sufficient for satisfactory recovery, the boron fluoride can be driven off in a substantially anhydrous form leaving calcium fluoride as the residue.

I shall now illustrate by way of examples methods of preparing boron fluoride from various complexes containing it but it will be distinctly understood that the invention will not be limited specifically to the details of the examples.

*Example 1.*—121.8 grams of $(H_2O)_3.BF_3$ (1 mol) is treated with 45 grams $CaF_2$ (.58 mol) in a flask attached to a short fractionation column. The mixture is heated in an oil bath to not more than 150° C. at one atmosphere pressure, during which the water and a small amount of boron fluoride is distilled out. The distillation can be effected at atmospheric or reduced pressures.

Subsequent heating of the solid residue, which consists mainly of $Ca(BF_4)_2$, to temperatures between 300° C., and 500° C., resulted in the evolution of boron fluoride according to the equation: $Ca(BF_4)_2 \rightarrow CaF_2 + 2BF_3$. Temperatures below and above those given may be used but the range given is preferred.

*Example 2.*—51.9 grams of $(H_2O)_2.BF_3$ (.5 mol) is treated with 25 grams NaF (.6 mol) in a flask attached to a short fractionation column. The mixture is heated in an oil bath to approximately 150° C., during which time water is evolved. The distillation can be conducted at atmospheric or reduced pressures. The $BF_3$ can be recovered by heating the solid, which consists mainly of $NaBF_4$, to higher temperatures.

*Example 3.*—About 60.9 grams $(H_2O)_3.BF_3$ (.5 mol) was treated with 60 grams NaCl (1 mol) in a flask attached to a short fractionating column. The mixture was heated in an oil bath to not more than 150° C., to drive off the water. The distillation can be carried out at atmospheric or reduced pressures.

The boron fluoride can be separated from the solid residue ($NaCl.BF_3$) by further heating to from 300–500° C.

If desired the condensate obtained by heating the mixture containing the water, boron fluoride, and a metal halide can be distilled to give a residue containing substantially all of the boron fluoride originally present in the condensate. This residue may be combined with the next batch of water-boron fluoride to be treated thereby providing a method of substantially complete recovery of the boron fluoride.

My process is particularly well adapted for use in separation of a boron-halogen constituent from addition compounds containing it and water and more particularly such addition compounds in which the halogen constituent is a highly volatile halide, such, for example, as the fluorides, chlorides, bromides, and iodides of boron. Calcium fluoride is particulary well adapted for use in a process for separating not only the water from a water-boron fluoride complex, but to separate the calcium fluoride-boron fluoride complex formed into boron fluoride and calcium fluoride. It will be appreciated that when employing boron fluoride as a condensing agent in organic acid reactions the use of calcium fluoride is particularly useful for the reason that the condensing agent can be recovered and used over and over again the sole loss in catalyst occurring from usual physical operating causes rather than from loss due to by-product formation.

From a consideration of the above specification it will be appreciated that many changes may be made in the process herein described without departing from the scope of the invention or sacrificing any of the advantages that may be derived therefrom.

I claim:

1. In a process for the preparation of boron fluoride and steps which comprise reacting a metal halide with a water-boron fluoride complex and subsequently separating from the resulting metal halide-boron fluoride complex the boron fluoride.

2. A process for the preparation of boron fluoride which comprises reacting a compound selected from the group consisting of an alkaline earth halide and an alkaline earth salt that will form a halide when reacted with a boron halogen compound with a water-boron fluoride complex and subsequently removing from the resulting complex the boron fluoride in a substantially anhydrous form.

3. A process for the preparation of a boron fluoride which comprises reacting a boron fluoride associated with water with calcium fluoride, heating and evaporating the water from the resulting mixture, and subsequently, at a higher temperature driving off the boron fluoride.

4. A process for the preparation of boron fluoride which comprises reacting a complex of water and boron fluoride with calcium fluoride, heating and evaporating the water from the resulting mixture, and subsequently, at a higher temperature driving off the boron fluoride.

5. A process for the preparation of boron trifluoride which comprises reacting a water-boron trifluoride complex with calcium fluoride, heating and removing all the water, and subsequently, at a higher temperature, driving off the boron trifluoride.

6. A process for the preparation of boron trifluoride which comprises reacting a mixture containing one mol of a boron trifluoride water complex with approximately one-half mol of calcium fluoride, heating and removing the water and subsequently, at a higher temperature, driving off the boron trifluoride.

7. In a process for the preparation of a boron fluoride the steps which comprise reacting a compound selected from the group consisting of an alkaline earth metal fluoride and an alkaline compound that will form a fluoride when reacted with a boron fluoride, with a water-boron fluoride complex and subsequently separating from the resulting metal halide-boron fluoride complex the boron fluoride.

8. In a process for the preparation of a boron fluoride compound the steps which comprise adding an alkaline earth metal halide to a water-boron fluoride complex and subsequently separating from the resulting alkaline earth metal halide-boron fluoride complex the boron fluoride by heat.

DONALD J. LODER.

CERTIFICATE OF CORRECTION.

Patent No. 2,135,460. November 1, 1938.

DONALD J. LODER.

It is hereby certified that error appears in the printed specification of the above numbered patent requiring correction as follows: Page 2, second column, line 13, claim 1, for the word "and" read the; and that the said Letters Patent should be read with this correction therein that the same may conform to the record of the case in the Patent Office.

Signed and sealed this 20th day of December, A. D. 1938.

Henry Van Arsdale (Seal) Acting Commissioner of Patents.